US008353754B2

(12) United States Patent
Walker

(10) Patent No.: US 8,353,754 B2
(45) Date of Patent: Jan. 15, 2013

(54) GAMING SYSTEM AND A METHOD OF GAMING

(75) Inventor: Samuel James Walker, Artarmon (AU)

(73) Assignee: Aristocrat Technologies Australia Pty Ltd (AU)

( * ) Notice: Subject to any disclaimer, the term of this patent is extended or adjusted under 35 U.S.C. 154(b) by 1029 days.

(21) Appl. No.: 11/971,661

(22) Filed: Jan. 9, 2008

(65) Prior Publication Data

US 2008/0194313 A1 Aug. 14, 2008

(30) Foreign Application Priority Data

Jan. 23, 2007 (AU) ................................ 2007900322

(51) Int. Cl.
*A63F 13/00* (2006.01)

(52) U.S. Cl. ............................................ 463/20; 463/21

(58) Field of Classification Search ............... 463/20–22
See application file for complete search history.

(56) References Cited

U.S. PATENT DOCUMENTS 6,921,335 B2 * 7/2005 Rodgers et al. ................. 463/30
2004/0033827 A1 * 2/2004 Gilmore et al. ................. 463/20
2004/0053676 A1 * 3/2004 Rodgers ........................... 463/20
2006/0068881 A1 * 3/2006 Casey ............................. 463/20

FOREIGN PATENT DOCUMENTS

AU 2007231804 A1 5/2008

* cited by examiner

*Primary Examiner* — Arthur O. Hall
*Assistant Examiner* — Allen Chan
(74) *Attorney, Agent, or Firm* — McAndrews, Held & Malloy, Ltd.

(57) ABSTRACT

A gaming system comprising: a display; a symbol selector arranged to select a plurality of symbols from a set of symbols for display in a display area on the display; a plural special symbol determiner arranged to determine whether a plural special symbol representing a number (N) of special symbols is to be activated; a symbol modifier arranged to operate in response to a determination that a plural special symbol is to be activated so as to modify display of at least one symbol selected by the symbol selector so that the symbols displayed in the display area after modification include N singular special symbols; and an outcome generator arranged to determine a game outcome based on the displayed symbols as modified by the symbol modifier.

40 Claims, 9 Drawing Sheets

GAMING SYSTEM AND A METHOD OF GAMING

CROSS REFERENCE TO RELATED APPLICATIONS

This application claims priority to Australian Patent Application No. AU2007900322, having an international filing date of Jan. 23, 2007, entitled "A Gaming System and a Method of Gaming", which is hereby incorporated by reference herein in its entirety.

FIELD

The present invention relates to a gaming system, a method of gaming, a game controller and computer program code.

BACKGROUND TO THE INVENTION

It is known to provide a gaming system which comprises a game controller arranged to randomly display several symbols from a predetermined set of symbols and to determine a game outcome such as a game win based on the displayed symbols. Such gaming systems may commonly be implemented as a stepper machine provided with reels with each reel carrying several symbols of the set, or a video machine wherein selected symbols are displayed on virtual reels on a video display.

It is also known to provide a gaming system which operates such that a wild symbol progressively moves along a predetermined path with game outcomes being determined for each position along the path.

While such gaming systems provide users with enjoyment, a need exists for alternative gaming systems in order to maintain or increase player enjoyment.

SUMMARY OF THE INVENTION

In accordance with a first aspect of the present invention, there is provided a gaming system comprising:

a display;

a symbol selector arranged to select a plurality of symbols from a set of symbols for display in a display area on the display;

a plural special symbol determiner arranged to determine whether a plural special symbol representing a number (N) of special symbols is to be activated;

a symbol modifier arranged to operate in response to a determination that a plural special symbol is to be activated so as to modify display of at least one symbol selected by the symbol selector so that the symbols displayed in the display area after modification include N singular special symbols; and an outcome generator arranged to determine a game outcome based on the displayed symbols as modified by the symbol modifier.

In an embodiment, the symbol modifier modifies the symbols selected by the symbol selector by replacing one or more selected symbols with a singular special symbol.

In an embodiment, the symbol modifier modifies the symbols selected by the symbol selector by displaying one or more special symbols in conjunction with the one or more selected symbols.

In an embodiment, the set of symbols comprises at least one plural special symbol such that it may appear at a display position within the display area, and wherein the plural special symbol determiner is arranged to activate each at least one plural special symbol which appears in the display area whereafter the symbol modifier is arranged to automatically select at least one new display position for at least one of the N singular special symbols.

In an embodiment, at least one singular special symbol is displayed in the position where the plural special symbol occurred.

In an embodiment, the symbol modifier is arranged to randomly select a new display position for each other singular special symbol.

In an embodiment, the symbol modifier selects a plurality of display positions corresponding to the number (N) of singular special symbols.

In an embodiment, the plural special symbol is displayed at a first display position on the display outside of the display area and the symbol modifier is arranged to modify N display positions within the display area to display the plural singular special symbols.

In an embodiment, the plural special symbol determiner is arranged to activate the plural special symbol in response to a trigger event.

In an embodiment, the special symbol is one or more of: a wild symbol, a multiplier symbol, a scatter symbol, a jackpot symbol, or a repeat win symbol.

In an embodiment, the plural special symbol is activated automatically in response to occurrence of the special symbol on the display.

In an embodiment, the special symbol is activated by a player.

In an embodiment, the special symbol is activated when a trigger event occurs.

In an embodiment, each special symbol is the same.

In an embodiment, at least one special symbol is different to another special symbol.

In an embodiment, the plural special symbol is a collective symbol different in appearance to the individual special symbols.

In an embodiment, the gaming system comprises a processor arranged to execute computer readable instructions stored in a memory to implement the, symbol selector, the plural special symbol determiner, the symbol modifier and the outcome generator.

In accordance with a second aspect of the present invention, there is provided a game controller for a gaming system, the game controller arranged to:

select a plurality of symbols from a set of symbols for display in a display area on a display;

determine whether a plural special symbol representing a number (N) of special symbols is to be activated;

modify display of at least one symbol selected by the symbol selector in response to a determination that a plural special symbol is to be activated, so that the symbols displayed in the display area after modification include N singular special symbols; and determine a game outcome based on the displayed symbols as modified by the symbol modifier.

In an embodiment, the symbol modifier modifies the symbols selected by the symbol selector by replacing one or more selected symbols with a singular special symbol.

In an embodiment, the symbol modifier modifies the symbols selected by the symbol selector by displaying one or more special symbols in conjunction with the one or more selected symbols.

In an embodiment, the set of symbols comprises at least one plural special symbol such that it may appear at a display position within the display area, and wherein the plural special symbol determiner is arranged to activate each at least one plural special symbol which appears in the display area whereafter the symbol modifier is arranged to automatically select at least one new display position for at least one of the N singular special symbols.

In an embodiment, at least one singular special symbol is displayed in the position where the plural special symbol occurred.

In an embodiment, the symbol modifier is arranged to randomly select a new display position for each other singular special symbol.

In an embodiment, the symbol modifier selects a plurality of display positions corresponding to the number (N) of singular special symbols.

In an embodiment, the game controller is arranged such that the plural special symbol is displayed at a first display position outside of the display area and the symbol modifier is arranged to modify N display positions within the display area to display the plural singular special symbols.

In an embodiment, the plural special symbol determiner is arranged to activate the plural special symbol in response to a trigger event.

In an embodiment, the special symbol is one or more of: a wild symbol, a multiplier symbol, a scatter symbol, a jackpot symbol, or a repeat win symbol.

In an embodiment, the plural special symbol is activated automatically in response to occurrence of the special symbol on the display.

In an embodiment, the special symbol is activated by a player.

In an embodiment, the special symbol is activated when a trigger event occurs.

In an embodiment, each special symbol is the same.

In an embodiment, at least one special symbol is different to another special symbol.

In an embodiment, the plural special symbol is a collective symbol different in appearance to the individual special symbols.

In accordance with a third aspect of the present invention, there is provided a method of gaming comprising:

selecting a plurality of symbols from a set of symbols for display in a display area on a display;

determining whether a plural special symbol representing a number (N) of special symbols is to be activated;

modifying display of at least one symbol selected by the symbol selector in response to a determination that a plural special symbol is to be activated, so that the symbols displayed in the display area after modification include N singular special symbols; and determining a game outcome based on the displayed symbols as modified by the symbol modifier.

In an embodiment, the method comprises modifying the display by replacing one or more selected symbols with a singular special symbol.

In an embodiment, the method comprises modifying the display by displaying one or more special symbols in conjunction with the one or more selected symbols.

In an embodiment, the set of symbols comprises at least one plural special symbol such that it may appear at a display position within the display area, and the method comprises activating each at least one plural special symbol which appears in the display area.

In an embodiment, at least one singular special symbol is displayed in the position where the plural special symbol occurred.

In an embodiment, the method comprises randomly selecting a new display position for each other singular special symbol.

In an embodiment, the method comprises selecting a plurality of display positions corresponding to the number (N) of singular special symbols.

In an embodiment, the method comprises initially displaying the plural special symbol at a first display position on the display outside of the display area.

In an embodiment, the method comprises activating the plural special symbol in response to a trigger event.

In an embodiment, the special symbol is one or more of: a wild symbol, a multiplier symbol, a scatter symbol, a jackpot symbol, or a repeat win symbol.

In accordance with a fourth aspect of the present invention, there is provided computer program code which when executed by a computer causes the computer to implement the method of the third aspect.

In accordance with a fifth aspect of the present invention, there is provided a computer readable medium comprising the program code of the fourth aspect.

In accordance with a sixth aspect of the present invention, there is provided a data signal comprising the program code of the fourth aspect.

BRIEF DESCRIPTION OF THE DRAWINGS

Certain embodiments of the invention will now be described in relation to the following drawings in which.

DETAILED DESCRIPTION

An embodiment provides a gaming system where symbols are randomly selected from a set of symbols for display and when the selected symbols include a plural special symbol representing a number (N) of special symbols, the display of symbols is modified to include N singular special symbols each representing one special symbol, and a game outcome is determined based on the modified symbols. In an alternative embodiment, the plural special symbol is displayed independently of the other symbols and activated in response to a trigger condition. The gaming system may be provided in a number of different forms.

In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 1:
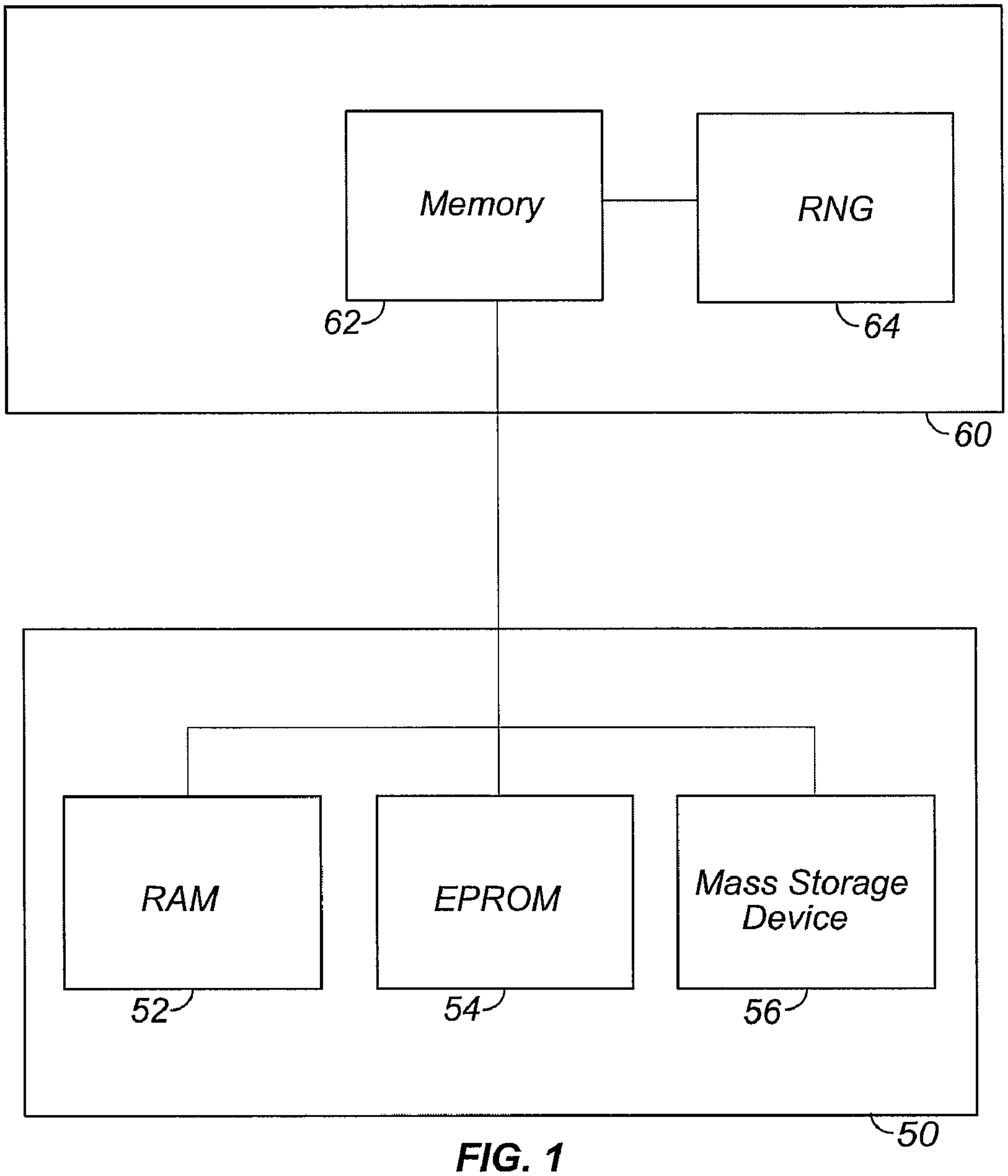
FIG. 1 is a block diagram of the core components of a gaming system.

Irrespective of the form, the gaming system comprises several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions and play the game.

Components of the player interface may vary from embodiment to embodiment but will typically include a credit mechanism 52 to enable a player to input credits and receive payouts, one or more displays 54 and a game play mechanism 56 that enables a player to input game play instructions.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
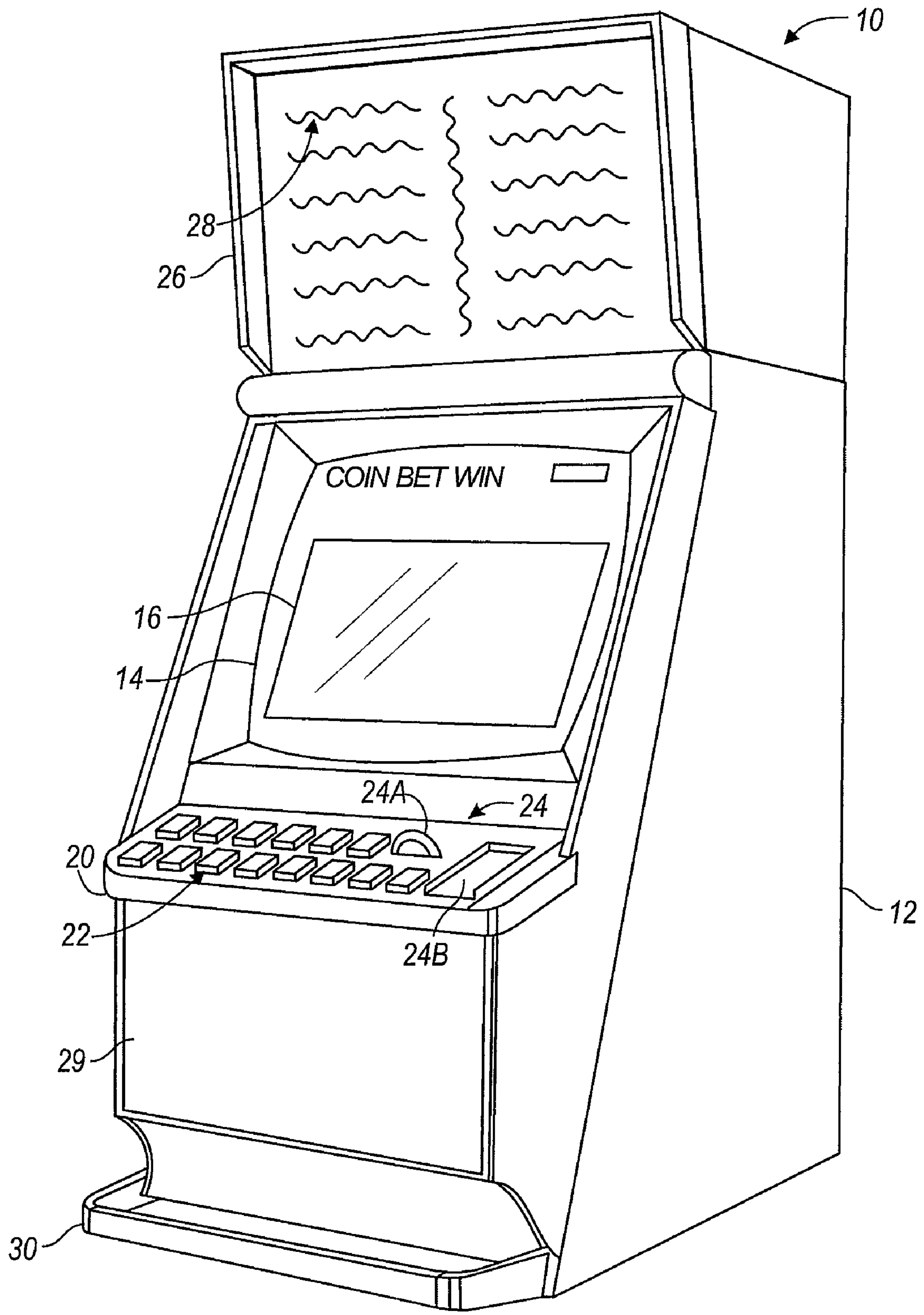
FIG. 2 is a perspective view of a gaming machine.

A gaming system in the form of a stand alone gaming machine 10 is illustrated in FIG. 2. The gaming machine 10 includes a console 12 having a display 14 on which is displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, or any other suitable video display unit. The top box 26 may also include a display, for example a video display unit, which may be of the same type as the display 14, or of a different type.

Figure 3:
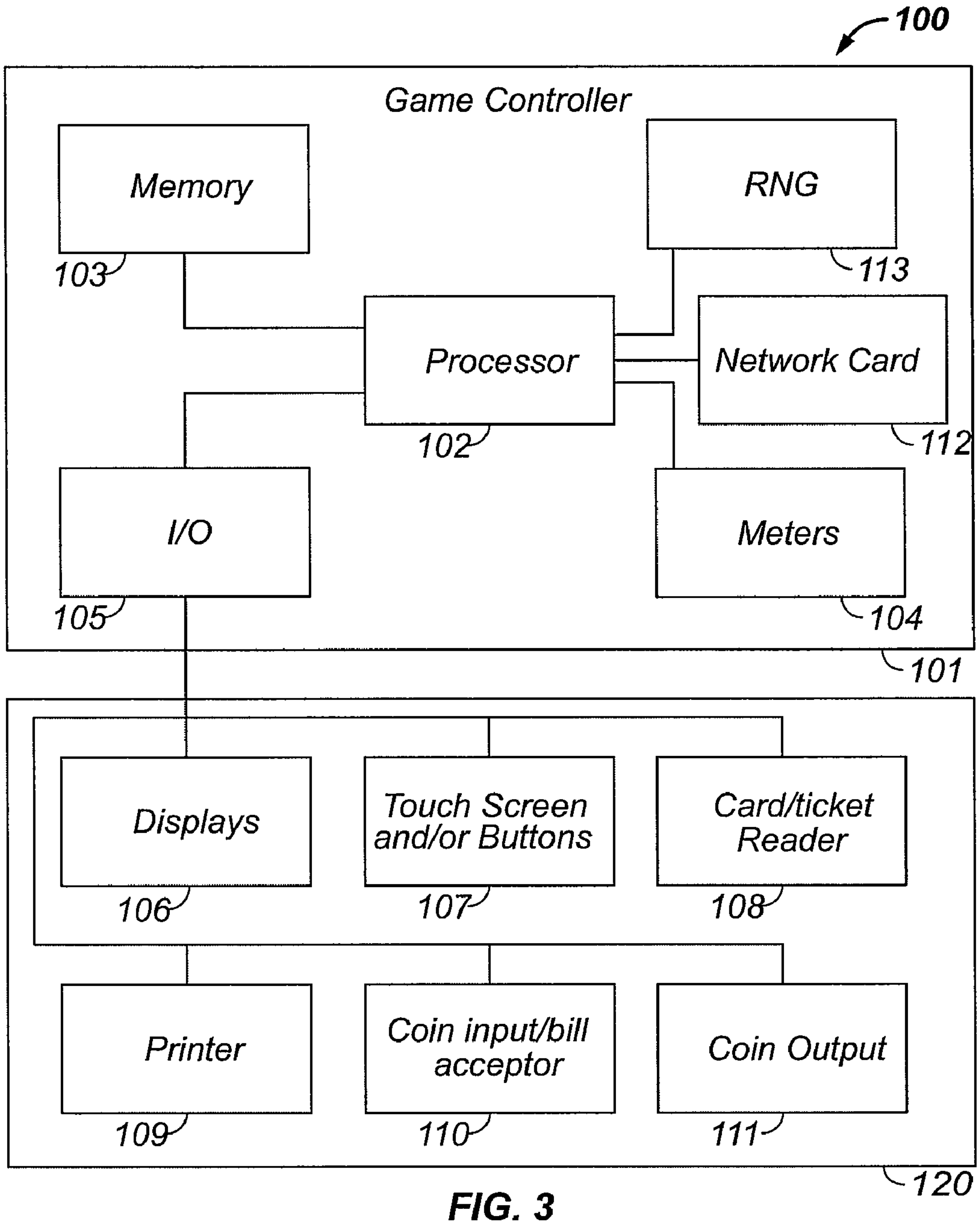
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 comprise one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
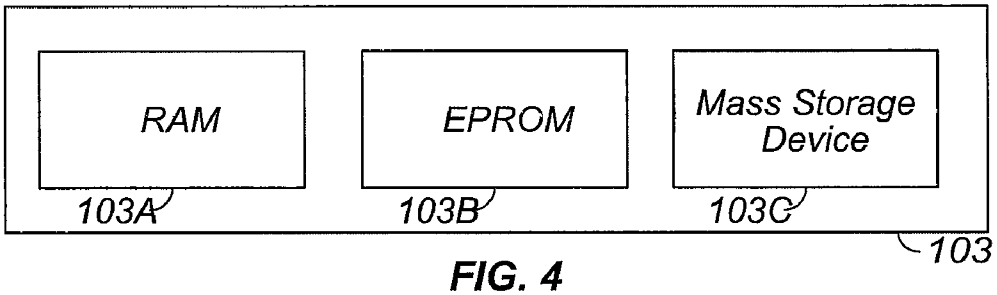
FIG. 4 is a block diagram representing the structure of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
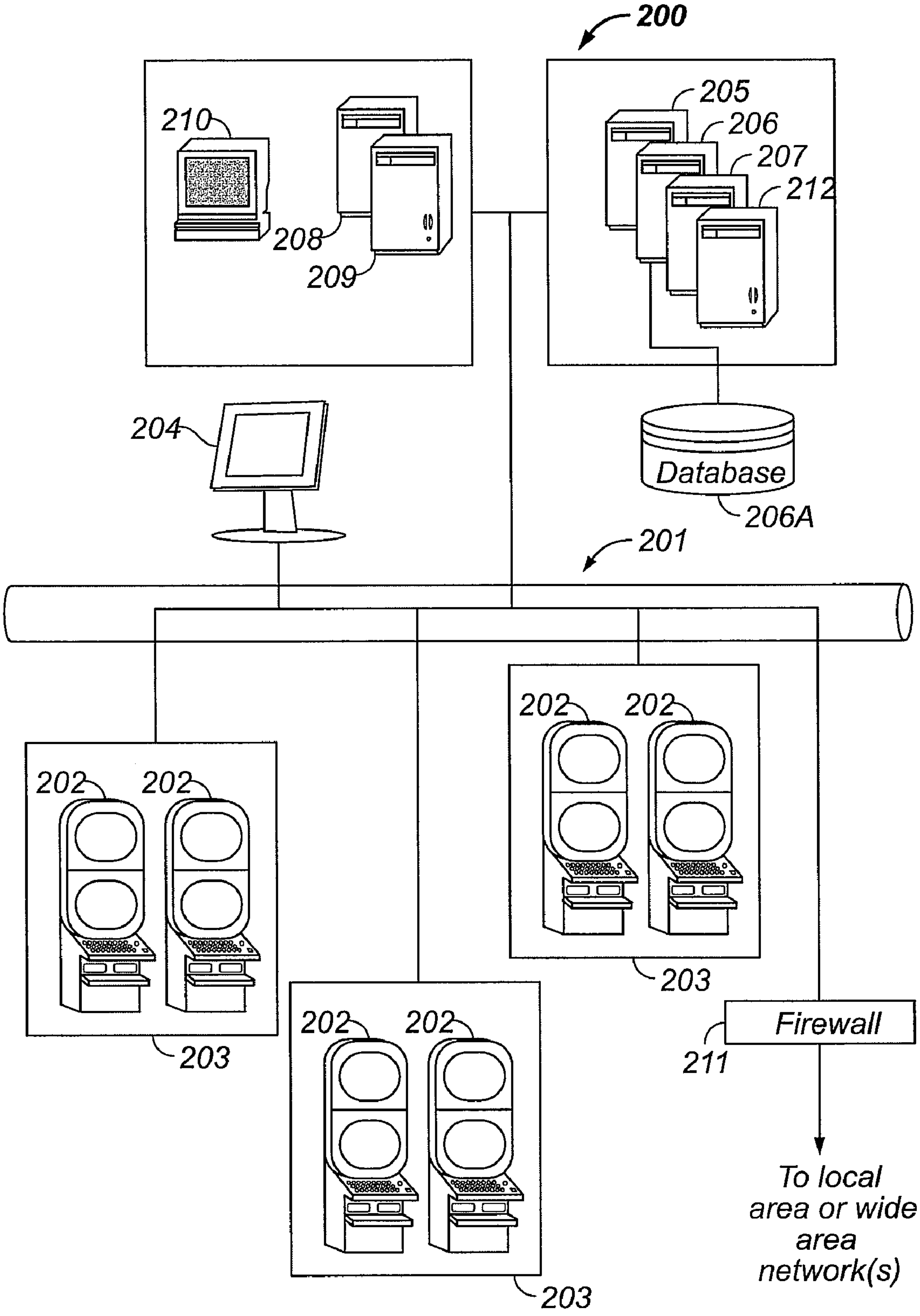
FIG. 5 is a diagram schematic of a networked gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to carry out the accounting functions for the Jackpot game. A loyalty system 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of games servers could be provided to run different games or a single game server may run a plurality of different games as required by the terminals.

Gaming systems for implementing games that involve a display of spinning reels as part of the display of the outcome of a game have either a video display or a mechanical display, these later machines most usually being "stepper" machines which have a separate motor for each reel. A video display is suited for implementation of the embodiment as it is easier to modify a video display.

The game controllers of such gaming machines select symbols by employing a stop determining function that randomly determines the stop position for each reel. For example, if there are five reels, each having twenty symbols, the stop determining function might determine that the stop positions are positions: 3, 13, 7, 9 and 17. The spinning of the reels is then controlled so that each symbol comes to a stop in the same row, typically a predetermined row in a "window" visible to the player on the display that which corresponds to a player playing a single win line. When a reel stops, the symbols will be in one of a plurality of possible symbol positions for that reel relative to the stop position.

Certain embodiments of the present invention relate to gaming systems that allow a player to select how many win lines of a plurality of win lines they will play in each game—i.e. a minimum of one win line up to the maximum number of win lines allowed by the game. Each win line is formed by a set of symbol positions consisting of one symbol position from each reel. That is, a predetermined symbol position of each reel is assigned to a win line. The symbol positions that constitute each of the win lines are usually advertised to the player by markings on the display or diagrams showing the symbol positions that correspond to each win line. Typically, the win lines will be constituted by symbol positions in the visible window.

Figure 6:
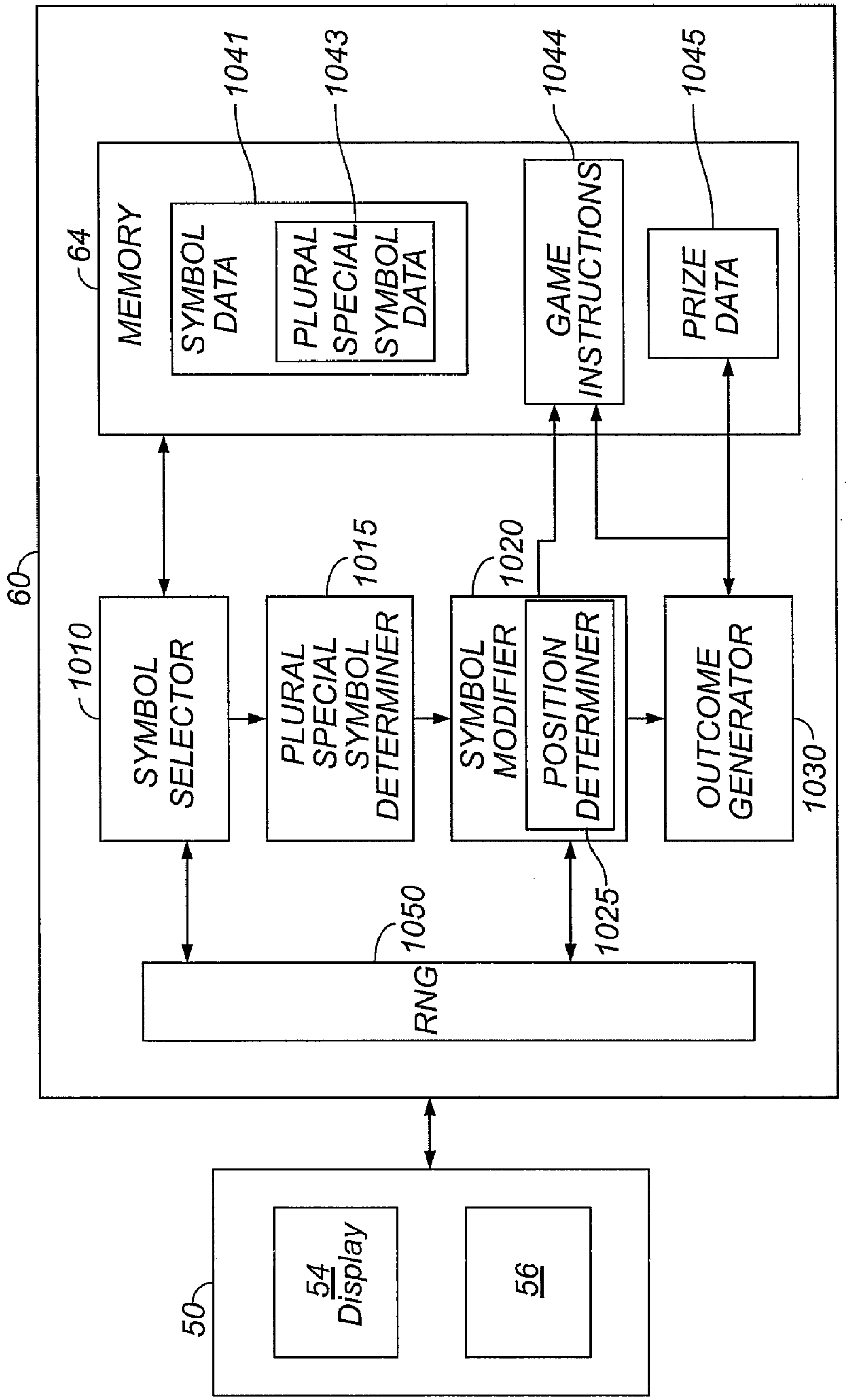
FIG. 6 is a further block diagram of the gaming system.
Figure 10:
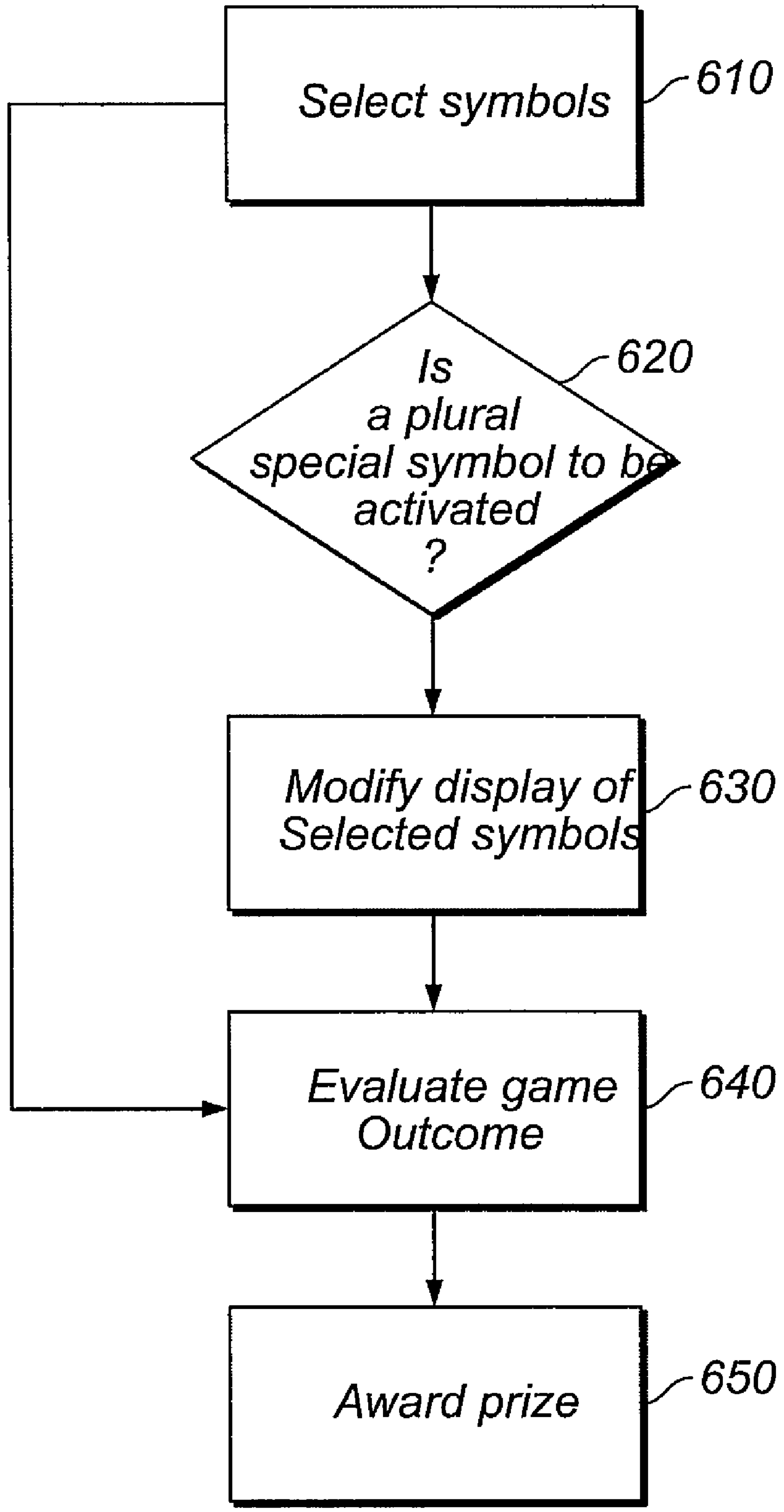
FIG. 10 is a flow chart of an embodiment.

The game controller 60 of the embodiment is shown in more detail in FIG. 6 and the method 1100 it implements is shown in FIG. 10.

In the embodiment symbol selector 1010 selects 1110 symbols 610 to appear on the display 54 by using a value obtained from the random number generator 1050 to obtain a stop position for each reel which specifies the symbols 1041 including one or more special symbols 1043 that are on the reels. That is, at least one reel includes a plural special symbol.

Persons skilled in the art will appreciate that symbol selection may not be strictly random, for example weightings may be applied to bias the symbol selections.

The symbols that are selected are displayed by the game controller 60 on display 54 in respective ones of a plurality of display positions. For example, for a five reel gaming system with three display lines there will be fifteen unique display positions defining a display area.

A plural special symbol determiner 1015 monitors the selected symbols to determine whether they include one or more plural special symbols each of which represents a number (N) of special symbols, for example 2 or 3 special symbols, and hence, whether a plural special symbol is to be activated 620. In the embodiment, each special symbol is a wild symbol. If the selected symbols include a plural special symbol, the plural special symbol determiner 1015 determines whether the plural special symbol should be activated. In the embodiment, the plural special symbol is activated automatically. However, in other embodiments one or more activation conditions may need to be met, for example, the player may be required to press a button of input mechanism 56 to activate the special symbol.

The plural special symbol determiner 1015 communicates to the symbol modifier 1020 data describing the characteristics of the plural special symbol including the display position it occupies and the number of special symbols it represents. The symbol modifier determines based on the game instructions 1044 and the plural special symbol data 1043 how to modify 630 the plural special symbol and other symbols in the display area to include the same number (N) of singular special symbols as represented by the plural special symbol. In the embodiment, one of the singular special symbols "remains" in the position where the plural special symbol occurred in the display area and new positions are randomly selected for the remaining (N−1) singular special symbols. That is, in an embodiment where the symbols are symbols of spinning reels, one of the singular special symbols is displayed where the plural special symbol occurred on the reels. The position determiner 1025 uses a value or values obtained from random number generator 1050 to select display positions for the N−1 singular special symbols, removing each occupied display position of the available set of display positions to prevent a collision of singular-special symbols. The N−1 singular special symbols are then displayed as moving to their new positions. In the case of a spinning reel embodiment, at different positions on the reels.

The special symbols can be displayed as moving to the new positions in a number of different styles, for example: "swinging", "walking", "dancing", "jumping" or "sliding".

The outcome generator 1030 then determines 640 based on game instructions 1044 whether the displayed symbols correspond to a winning outcome on any win line the player is playing. If there is a winning outcome, the outcome generator determines the applicable prize from prize data 1045 and awards 650 the prize to the player.

Typically, in the above embodiment, the plural special symbol will only be available on the reels during a feature game. The player's eligibility for the feature can be determined in accordance with any one of a number of known rules including but not limited to:

being available to all players for all bets;

being available only for certain bet types; or different levels of feature being available for different bets. For example, standard bets may be entitled to one special symbol and feature bets may be entitled to additional special symbols.

The feature can commence in accordance with any one of a number of known rules including but not limited to:

when a special symbol, or a combination of symbols appears in the window;

when a time elapses;

when a system event occurs;

when an underlying random event occurs, for example, in the course of a game; or when a turnover has elapsed.

Typically, the special symbol are those that have an associated function such that they provide an additional play characteristic. Such functions include a wild function, a multiplier function, a scatter function, a jackpot function, a repeat win function, or any other function which may be applied to a symbol or to the game.

In the embodiment described above, the symbol selector 1010, the symbol modifier 1020, the plural special symbol determiner 1015, and the outcome generator 1030 are at least partly implemented using the processor 62 and software routines that are stored in memory 64, although it will be understood that other implementations are envisaged. For example, a dedicated circuit could implement the random number generator 1050.

Figure 7:
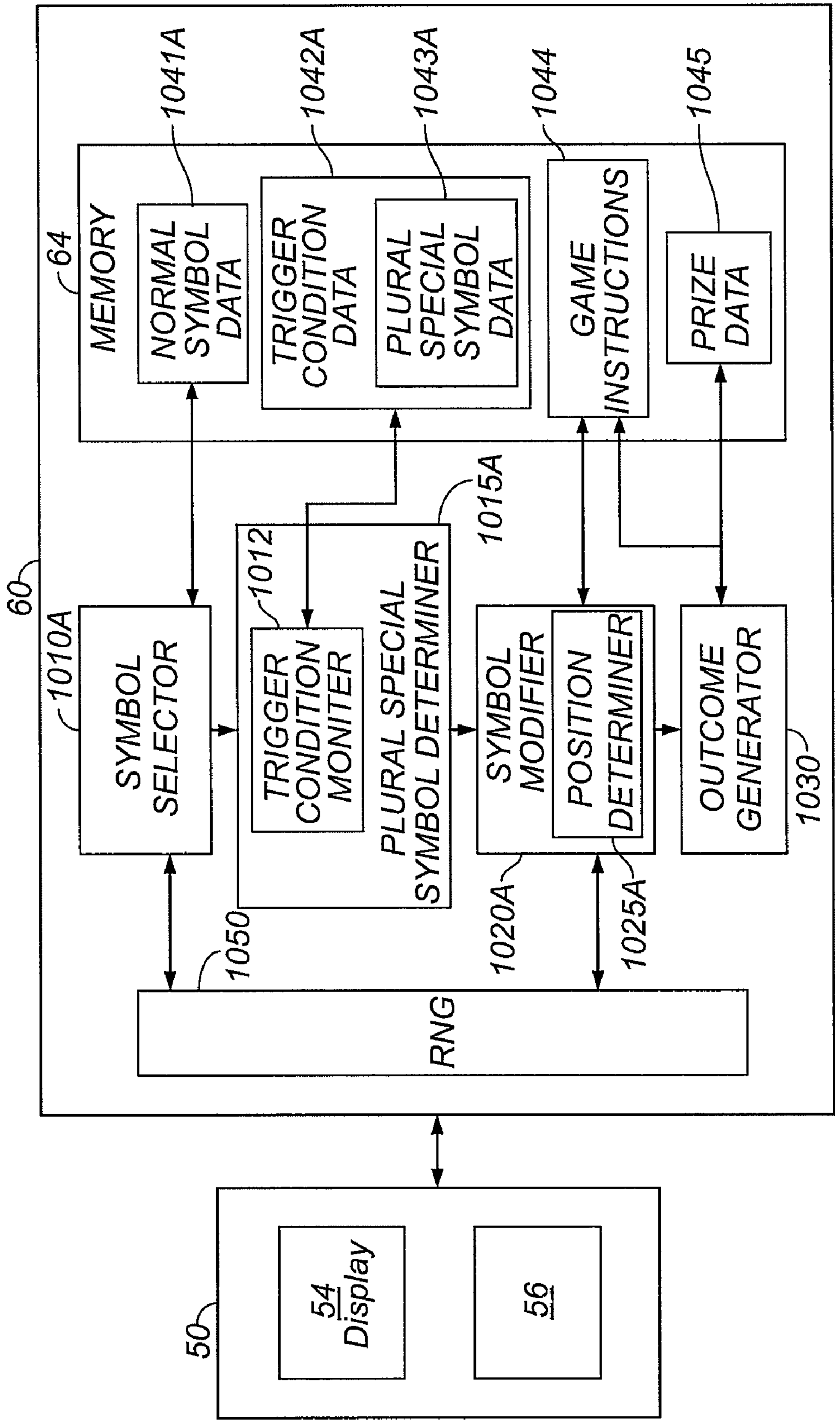
FIG. 7 is a block diagram of one alternative embodiment.

FIG. 7 shows an alternative arrangement suitable for implementing the method of gaming where the special symbol is displayed outside of the display area. Where possible, the same or like numbers are used for elements that correspond to those found in FIG. 6. In this embodiment, trigger condition monitor 1012 monitors for a trigger condition 1042A. When the trigger condition occurs, the trigger condition monitor 1012 causes a plural special symbol 1043A to be displayed at a first display position outside the display area for the symbols selected by the symbol selector 1010A. The plural special symbol determiner 1015A then determines whether the plural special symbol should be activated. This may be automatically, in response to a further trigger condition, or by the player pressing an activation button. The symbol modifier 1020A then modifies N symbol positions selected by position determiner 1025A and the outcome generator 1030 determines the game outcome.

Other variations will be apparent to a person skilled in the art and should be understood as falling within the scope of the invention described herein. For example, the symbol section game could be a card game or a ball draw game such as keno, bingo or arishinko.

While it is described above that each special symbol is the same, it is possible for there to be more than one singular special symbol—e.g. a wild and a multiplier. Further, the plural special symbol need not be a representation of the same type as the singular special symbol. For example, a hat could change into four rabbits.

While it is described above that the new positions are selected randomly, some constraints may be placed on random selection of new positions, for example so that the same position is not selected twice. In other embodiment, the positions may be defined by a set of rules. For example, by a defined path from where the initial plural special symbol appeared.

Persons skilled in the art will also appreciate that the method of the embodiment could be embodied in program code. The program code could be supplied in a number of ways, for example on a computer readable medium, such as a disc or a memory (for example, that could replace part of memory 103) or as a data signal (for example, by downloading it from a server).

Persons skilled in the art will appreciate that a rather than selecting win lines to establish a win entitlement, other techniques may be used. Further in most games, it is typical for the player's entitlement to be affected by the amount they wager and selections they make (i.e. the nature of the wager. In many games, the player's win entitlement is not strictly limited to the lines they have selected, for example, "scatter" pays are awarded independently of a player's selection of pay lines and are an inherent part of the win entitlement.

Persons, skilled in the art, will appreciate that in other embodiments, the player may obtain a win entitlement by selecting a number of reels to play. Such games are marketed under the trade name "Reel Power" by Aristocrat Leisure Industries Pty Ltd. The selection of the reel means that each symbol of the reel can be substituted for a symbol at one or more designated display positions. In other words, all symbol positions of a selected reel can be used to form symbol combinations with designated, displayed symbol positions of other reels.

In other embodiments a player win entitlement may be affected by purchasing access to particular pay tables—e.g. a first bet amount entitles the player to wins including cherries and a second amount entitles them to wins including plums. The win entitlement is not always purchased—e.g. a series of free games may be awarded.

It will be understood to persons skilled in the art of the invention that many modifications may be made without departing from the spirit and scope of the invention.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Further variations will become apparent from the following examples.

Example 1

Figure 8A:
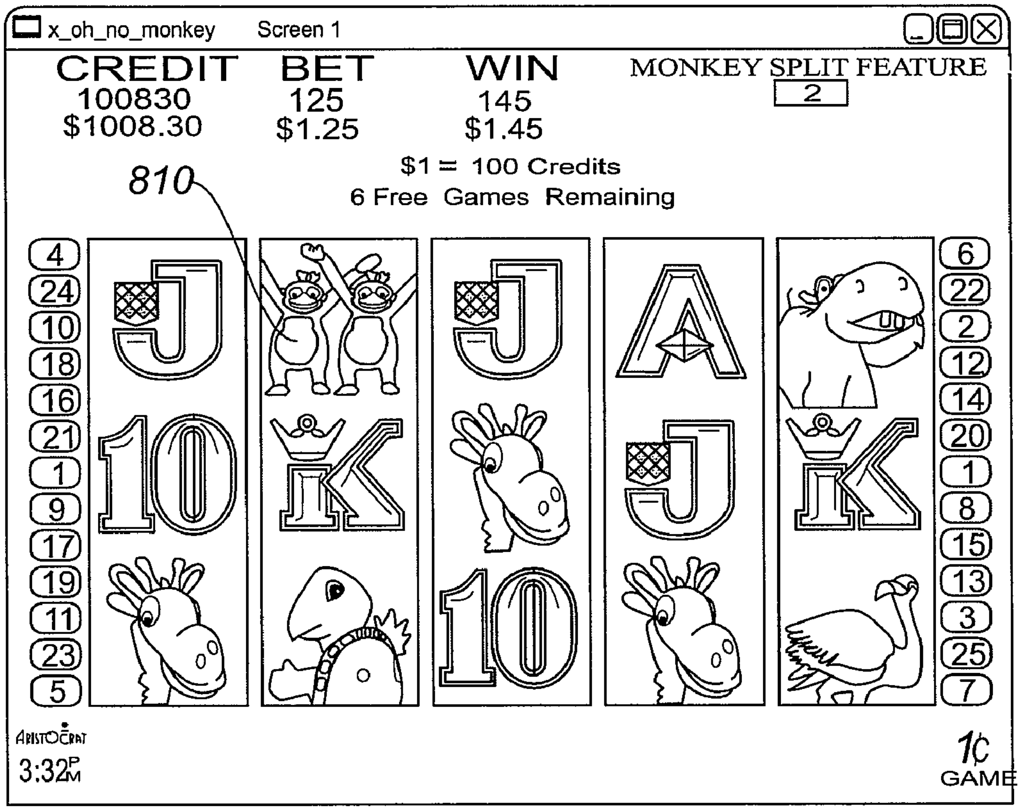
FIGS. 8A and 8B show exemplary displays of a first example.
Figure 8B:
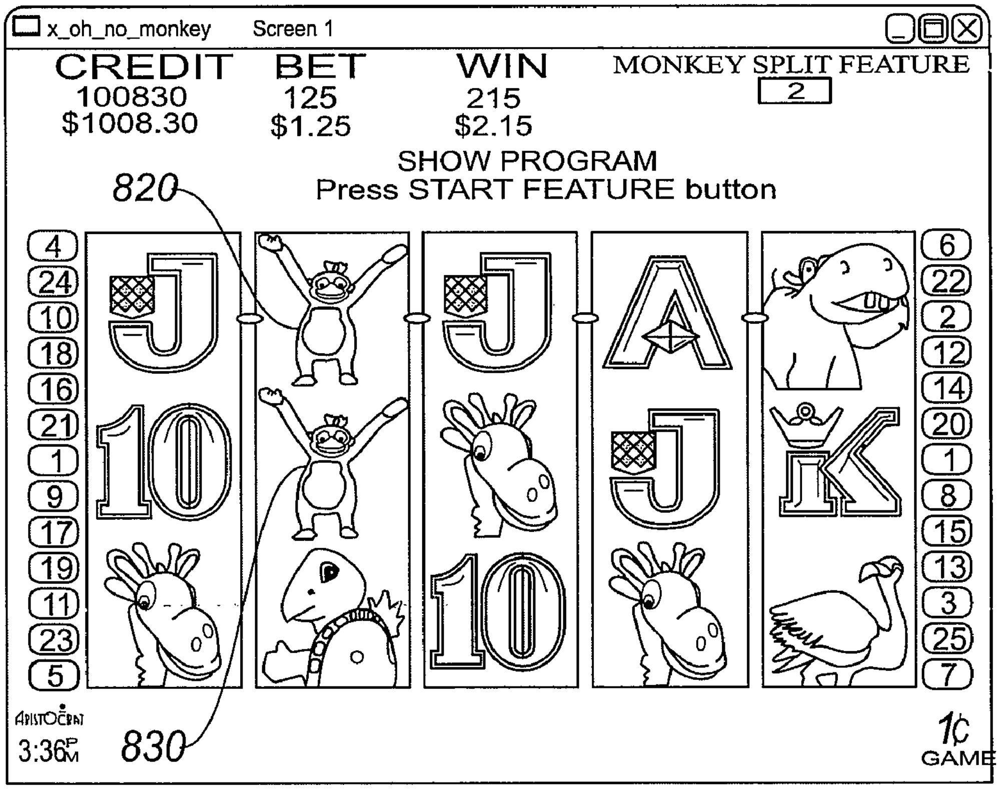

As shown in FIGS. 8A and 8B, this is a video spinning reel machine with 5 reels and 3 symbols visible in the window. During the normal play of the game, a symbol occurs on the reels displaying an image of one monkey. During a series of feature games a new symbol is available which shows 2 monkeys. When the "2 monkey" symbol 810 appears on the reels (see FIG. 8A), the symbol automatically changes to show a "1 monkey" symbol 820 at the initial location and then another "1 monkey" symbol 830 is randomly located somewhere else on the reels (see FIG. 8B). Prizes are then evaluated.

Figure 9A:
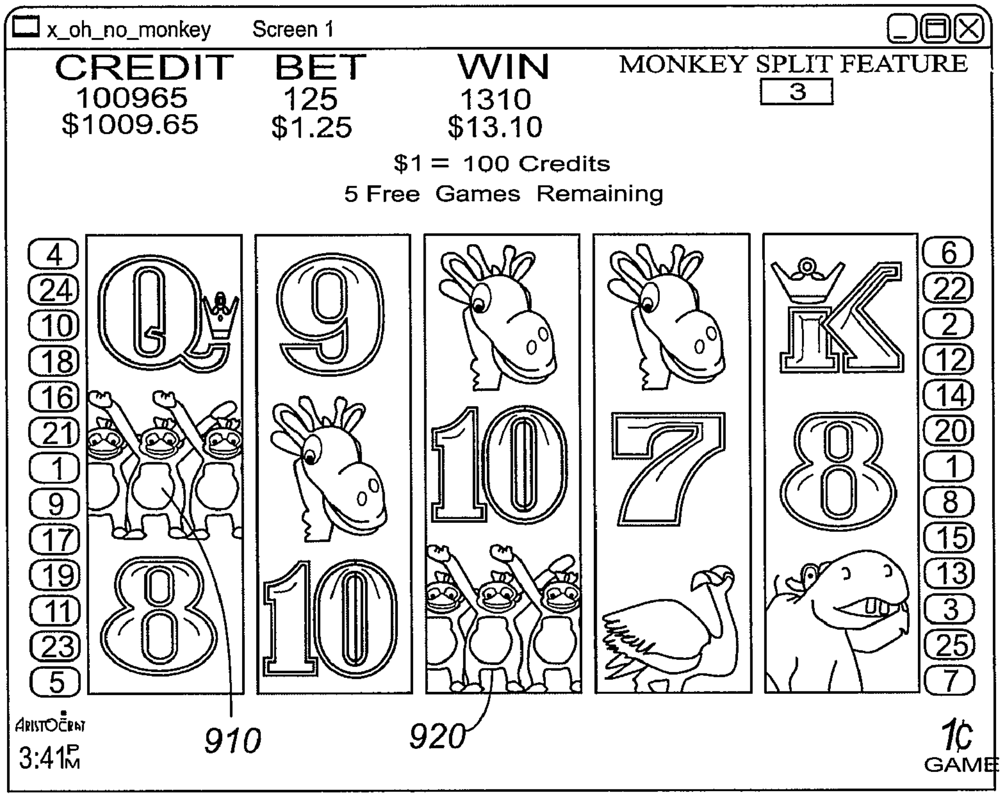
FIGS. 9A and 9B show exemplary displays of a second example.
Figure 9B:
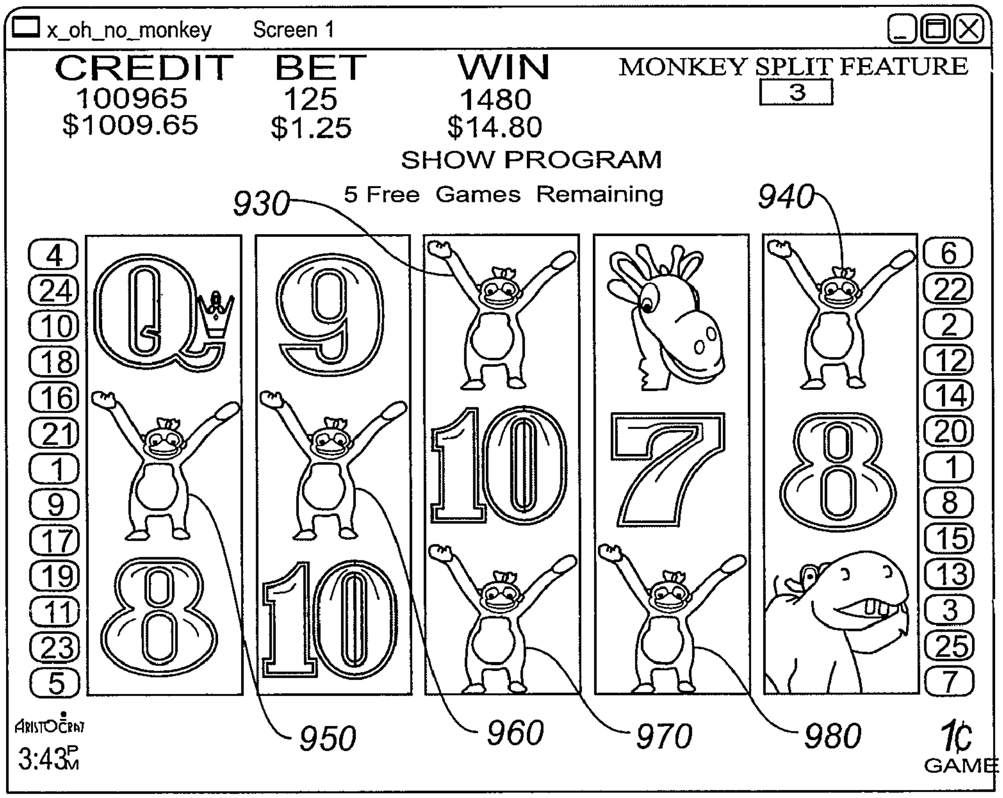

If a "3 monkey" symbol 910,920 appears on the reels (see FIG. 9A), the symbol automatically changes to show two sets of 3 "1 monkey" symbols with 1 symbol of each set 950,970 remaining at the initial location and 2 symbols of each set 930,940,960,980 relocating randomly (see FIG. 9B). Prizes are then evaluated. Note that FIG. 9 shows that it is possible for more than one plural special symbol to appear on the reels.

Example 2

A multiline card game with 5 cards per row and 3 rows of cards. The game is draw poker with a joker. During a feature series, a new card is added to the pack which is a 2 joker card. At the end of the deal and draw, any "2 joker" card changes to 2 "joker" cards and 1 joker card randomly replaces any cards on the screen. Prizes are then evaluated.

Example 3

A wild ball keno game is played. During a feature game, a wild ball can be replaced by a "double wild" ball. At the conclusion of a draw which includes a "double wild" ball, the "double wild" ball changes into 2 "wild" balls and the 2 wild balls randomly locate on the keno scorecard.

Example 4

A video spinning reel game. During a feature sequence, a "magician" symbol will randomly appear on the screen outside the reel display. When a trigger condition occurs, the magician will pull rabbits from his hat until there are plural rabbits on the display (still outside the reel display)—for example, this could be on a video top box. The rabbits then randomly replace symbols already on the reels. Prizes are evaluated with the rabbits as a wild symbol.

The invention claimed is:

1. A gaming system comprising:

a display;

a symbol selector arranged to select a plurality of symbols from a set of symbols for display in respective ones of a plurality of display positions on the display;

a plural special symbol determiner arranged to determine whether to activate a plural special symbol representing a number (N) of special symbols, wherein when the plural special symbol determined is to be activated, a representation of the plural special symbol is displayed at a random location on the display outside of the plurality of display positions;

a symbol modifier arranged to, in response to the plural special symbol being activated, modify the plural special symbol so as to display respective representations of a plurality of N singular symbols outside the plurality of display positions, and modify the display of at least one symbol selected by the symbol selector so that the representations of the N singular symbols move into the plurality of display positions and, after modification include N singular special symbols displayed at respective ones of N symbol display positions, wherein at least one of the respective ones of N symbol display positions is selected at random; and an outcome generator arranged to determine a game outcome based on the displayed symbols as modified by the symbol modifier.

2. A gaming system as claimed in claim 1, wherein the symbol modifier modifies the symbols selected by the symbol selector by replacing one or more selected symbols with a singular special symbol.

3. A gaming system as claimed in claim 1, wherein the symbol modifier modifies the symbols selected by the symbol selector by displaying one or more special symbols in conjunction with the one or more selected symbols.

4. A gaming system as claimed in claim 1, and wherein the plural special symbol determiner is arranged to activate each at least one plural special symbol which appears in the display area.

5. A gaming system as claimed in claim 4, wherein at least one singular special symbol is displayed in one of the plurality of display positions.

6. A gaming system as claimed in claim 5, wherein the symbol modifier is arranged to randomly select a new display position for each singular special symbol.

7. A gaming system as claimed in claim 1, wherein the symbol modifier selects a plurality of display positions corresponding to the number (N) of singular special symbols.

8. A gaming system as claimed in claim 1, wherein the plural special symbol determiner is arranged to activate the plural special symbol in response to a trigger event.

9. A gaming system as claimed in claim 1, wherein the special symbol is one or more of: a wild symbol, a multiplier symbol, a scatter symbol, a jackpot symbol, or a repeat win symbol.

10. A gaming system as claimed in claim 1, wherein the plural special symbol is activated automatically in response to occurrence of the plural special symbol on the display.

11. A gaming system as claimed in claim 1, wherein the plural special symbol is activated by a player.

12. A gaming system as claimed in claim 1, wherein the plural special symbol is activated when a trigger event occurs.

13. A gaming system as claimed in claim 1 wherein each special symbol is the same.

14. A gaming system as claimed in claim 1 wherein at least one special symbol is different to another special symbol.

15. A gaming system as claimed in claim 1, wherein the plural special symbol is a collective symbol different in appearance to the individual special symbols.

16. A gaming system as claimed in claim 1 comprising a processor arranged to execute computer readable instructions stored in a memory to implement the symbol selector, the plural special symbol determiner, the symbol modifier and the outcome generator.

17. A game controller for a gaming system, the game controller arranged to:

select a plurality of symbols from a set of symbols for display in respective ones of a plurality of display positions on a display;

determine whether a plural special symbol representing a number (N) of special symbols is to be activated;

display a representation of the plural special symbol at a random location outside the plurality of display positions;

modify the plural special symbol so as to display respective representations of a plurality of N singular symbols outside the plurality of display positions;

modify the display of at least one symbol selected by the symbol selector so that the representations of the N singular symbols move into the plurality of display positions and after modification include N singular special symbols displayed at respective ones of N symbol display positions, wherein at least one of the respective ones of N symbol display positions is selected at random; and determine a game outcome based on the displayed symbols as modified by the symbol modifier.

18. A game controller as claimed in claim 17, wherein the symbol modifier modifies the symbols selected by the symbol selector by replacing one or more selected symbols with a singular special symbol.

19. A game controller as claimed in claim 17, wherein the symbol modifier modifies the symbols selected by the symbol selector by displaying one or more special symbols in conjunction with the one or more selected symbols.

20. A game controller as claimed in claim 18, and wherein the plural special symbol determiner is arranged to activate each at least one plural special symbol which appears in the display area.

21. A game controller as claimed in claim 20, wherein at least one singular special symbol is displayed in one of the plurality of display positions.

22. A game controller as claimed in claim 21, wherein the symbol modifier is arranged to randomly select a new display position for each singular special symbol.

23. A game controller as claimed in claim 17, wherein the symbol modifier selects a plurality of display positions corresponding to the number (N) of singular special symbols.

24. A game controller as claimed in claim 17, wherein the plural special symbol determiner is arranged to activate the plural special symbol in response to a trigger event.

25. A game controller as claimed in claim 17, wherein the special symbol is one or more of: a wild symbol, a multiplier symbol, a scatter symbol, a jackpot symbol, or a repeat win symbol.

26. A game controller as claimed in claim 17, wherein the plural special symbol is activated automatically in response to occurrence of the plural special symbol on the display.

27. A game controller as claimed in claim 17, wherein the plural special symbol is activated by a player.

28. A game controller as claimed in claim 17, wherein the plural special symbol is activated when a trigger event occurs.

29. A game controller as claimed in claim 17 wherein each special symbol is the same.

30. A game controller as claimed in claim 17 wherein at least one special symbol is different to another special symbol.

31. A game controller as claimed in claim 17, wherein the plural special symbol is a collective symbol different in appearance to the individual special symbols.

32. A method of gaming comprising:

selecting a plurality of symbols from a set of symbols for display in respective ones of a plurality of display positions on a display;

determining whether a plural special symbol representing a number (N) of special symbols is to be activated;

displaying a representation of the plural special symbol at a random location outside the plurality of display positions;

modifying the plural special symbol so as to display respective representations of a plurality of N singular symbols outside the plurality of display positions;

modifying the display of at least one symbol selected by the symbol selector so that the representations of the N singular symbols move into the plurality of display positions and after modification include N singular special symbols displayed at respective ones of N symbol display positions, wherein at least one of the respective ones of N symbol display positions is selected at random; and determining a game outcome based on the displayed symbols as modified by the symbol modifier.

33. A method as claimed in claim 32, wherein the comprising modifying the display by replacing one or more selected symbols with a singular special symbol.

34. A method as claimed in claim 32, comprising modifying the display by displaying one or more special symbols in conjunction with the one or more selected symbols.

35. A method as claimed in claim 32, and the method further comprising activating each at least one plural special symbol which appears in the display area.

36. A method as claimed in claim 35, wherein at least one singular special symbol is displayed in one of the plurality of display positions.

37. A method as claimed in claim 36, and further comprising randomly selecting a new display position for each singular special symbol.

38. A method as claimed in claim 32, comprising selecting a plurality of display positions corresponding to the number (N) of singular special symbols.

39. A method as claimed in claim 32, and further comprising activating the plural special symbol in response to a trigger event.

40. A method as claimed in claim 32, wherein the special symbol is one or more of: a wild symbol, a multiplier symbol, a scatter symbol, a jackpot symbol, or a repeat win symbol.

* * * * *

UNITED STATES PATENT AND TRADEMARK OFFICE

CERTIFICATE OF CORRECTION

PATENT NO. : 8,353,754 B2
APPLICATION NO. : 11/971661
DATED : January 15, 2013
INVENTOR(S) : Samuel Walker It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1153 days.

Signed and Sealed this
Eleventh Day of November, 2014

Michelle K. Lee

Michelle K. Lee
*Deputy Director of the United States Patent and Trademark Office*